(12) United States Patent
Chen

(10) Patent No.: US 12,551,195 B2
(45) Date of Patent: Feb. 17, 2026

(54) CO-REGISTRATION OF INTRAVASCULAR AND EXTRAVASCULAR IMAGING FOR EXTRAVASCULAR IMAGE WITH INTRAVASCULAR TISSUE MORPHOLOGY

(71) Applicant: PHILIPS IMAGE GUIDED THERAPY CORPORATION, San Diego, CA (US)

(72) Inventor: Sara Rose Chen, San Diego, CA (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 292 days.

(21) Appl. No.: 17/761,353

(22) PCT Filed: Sep. 15, 2020

(86) PCT No.: PCT/EP2020/075682
§ 371 (c)(1),
(2) Date: Mar. 17, 2022

(87) PCT Pub. No.: WO2021/058317
PCT Pub. Date: Apr. 1, 2021

(65) Prior Publication Data
US 2022/0346756 A1    Nov. 3, 2022

Related U.S. Application Data

(60) Provisional application No. 62/904,525, filed on Sep. 23, 2019.

(51) Int. Cl.
*A61B 8/00* (2006.01)
*A61B 8/08* (2006.01)
*A61B 8/12* (2006.01)

(52) U.S. Cl.
CPC ............ *A61B 8/5261* (2013.01); *A61B 8/085* (2013.01); *A61B 8/0891* (2013.01); *A61B 8/12* (2013.01); *A61B 8/463* (2013.01)

(58) Field of Classification Search
CPC ..... A61B 8/5261; A61B 8/085; A61B 8/0891; A61B 8/12; A61B 8/463; A61B 8/4477; A61B 8/0883; A61B 8/4416
See application file for complete search history.

(56) References Cited

U.S. PATENT DOCUMENTS 7,074,188 B2   7/2006  Nair
7,903,014 B1   3/2011  Pan
(Continued)

OTHER PUBLICATIONS

International Search Report and Written Opinion of PCT/EP2020/075682, dated Dec. 8, 2020.
(Continued)

*Primary Examiner* — Jonathan Cwern

(57) ABSTRACT

A system is provided that includes a processor circuit in communication with an intravascular imaging catheter. The processor circuit is operable to: receive an intravascular imaging signal; perform, tissue characterization to identify a plaque component of the blood vessel; generate an intravascular image; receive an extravascular image of a blood vessel; co-register the intravascular image and the extravascular image to associate the intravascular image with a location of the blood vessel in the extravascular image; determine, if a spatial distribution of the plaque component within the intravascular image satisfies a criterion associated with the spatial distribution; and when the spatial distribution satisfies the criterion, output a screen display comprising: the extravascular image; and a first indicator at the location of the blood vessel in extravascular image. The first indicator is representative of the spatial distribution of the plaque component. Associated methods and devices are also provided.

16 Claims, 9 Drawing Sheets

(56) References Cited

U.S. PATENT DOCUMENTS

| | | | |
|---|---|---|---|
| 8,298,147 B2 | 10/2012 | Huennekens | |
| 2007/0038061 A1* | 2/2007 | Huennekens | A61B 8/12 600/407 |
| 2007/0260141 A1* | 11/2007 | Margolis | A61B 8/0833 600/437 |
| 2014/0163369 A1 | 6/2014 | Nair | |
| 2015/0254866 A1* | 9/2015 | Mendonca | G06V 10/753 382/132 |
| 2016/0157802 A1* | 6/2016 | Anderson | A61B 6/504 600/407 |
| 2017/0076014 A1* | 3/2017 | Bressloff | A61F 2/915 |
| 2018/0271614 A1* | 9/2018 | Kunio | A61B 90/37 |

OTHER PUBLICATIONS

Costa et al "Impact of Stent Deployment Procedural Factors on Long-Term Effectiveness and Safety of Sirolimus-Eluting Stents (final results of the multicenter prospective STLLR trial)", American Journal of Cardiology, vol. 101, No. 12, pp. 1704-1711, Jun. 15, 2008.

Nair, Anuja et al "Coronary Plaque Classification with Intravascular Ultrasound Radiofrequency Data Analysis", Circulation, vol. 106, pp. 220-2206, 2002.

\* cited by examiner

CO-REGISTRATION OF INTRAVASCULAR AND EXTRAVASCULAR IMAGING FOR EXTRAVASCULAR IMAGE WITH INTRAVASCULAR TISSUE MORPHOLOGY

CROSS-REFERENCE TO RELATED APPLICATIONS

This application is the U.S. national stage entry of International Application No. PCT/EP2020/075682, filed Sep. 15, 2020, which claims priority to and the benefit of U.S. Provisional Application No. 62/904,525, filed Sep. 23, 2019, each of which is hereby incorporated by reference in its entirety.

TECHNICAL FIELD

The present invention generally relates to intravascular imaging, such as intravascular ultrasound (IVUS) imaging, and in particular to identifying tissue morphology inside of human vasculature. More specifically, the present invention is directed to devices, methods, and systems for co-registration of intravascular imaging and extravascular imaging for display of intravascular tissue morphology on an extravascular image, such as an angiogram.

BACKGROUND

Intravascular imaging is widely used technique in interventional cardiology as a diagnostic tool for assessing a diseased vessel, such as an artery, within the human body to determine the need for treatment, to guide the intervention, and/or to assess its effectiveness. IVUS and optical coherence tomography (OCT) are two medical imaging modalities that exist today to help identify tissue morphology inside of human vasculature. Intravascular imaging using a catheter is typically performed in relation to an angiogram of the blood vessel. A major disadvantage is that the key features of the intravascular tissue morphological assessment are displayed independently of the angiogram. For example, conventional systems that co-register the intravascular image with the angiogram require the user to manually identify a point on the angiogram to separately visualize the intravascular image with tissue morphology information. Further, the conventional systems do not have the ability to correlate the features of the tissue morphological assessment with the angiogram. The correlation between the tissue morphological assessments and the angiogram must be done manually by a clinician and requires that the clinician switch frequently between different views within the system to gather information. The medical procedure using the conventional systems can be tedious and time consuming due to additional steps to be taken to interpret all the images and find landmarks for correlation. As a result, despite providing valuable information to the clinician, tissue classification procedures are underused due to these usability challenges.

SUMMARY

The present disclosure is directed to relating intravascular tissue morphology to an extravascular image. For example, intravascular imaging data, such as intravascular ultrasound (IVUS) imaging data can be obtained from a blood vessel using an intravascular imaging catheter. A computer's processor circuit can determine the tissue morphology, including the types and locations of plaque, within a cross-sectional image of the vessel based on the intravascular imaging data. The processor circuit can also determine when the spatial distribution of one or more types of plaque satisfy a criterion. For example, the criterion can be a spatial description of a particular kind of plaque buildup that the physician needs to be aware of. Location(s) of the blood vessel that satisfy the criterion can be shown to a physician on an extravascular image of the blood vessel, such an x-ray image. The processor circuit co-registers the intravascular imaging data with the extravascular image so that the spatial relationship between the intravascular imaging data and the extravascular image is known. The location(s) of the blood vessel satisfying the criterion are identified with a visual marking that draws the physician's attention to that part of the extravascular image.

Linking the tissue morphology and extravascular image advantageously allows the physician to plan and conduct safer and more efficacious therapy. For example, the present disclosure can advantageously decrease the likelihood of a geographic miss, in which an area that is treated does not match the area that needs treatment. Serious consequences with increased adverse events can result from geographic misses, as reported in the clinical trial by Costa et al., "Impact of stent deployment procedural factors on long-term effectiveness and safety of sirolimus-eluting stents (final results of the multicenter prospective STLLR trial)", American Journal of Cardiology, 101(12):1704-11, Jun. 15, 2008. Stent deployment can be advantageously completed. By providing the location of necrotic core on the angiogram, the physician can more accurately position a stent within the blood vessel so that stent struts extend over and cover the necrotic core. This advantageously prevents the stent edges from being landed in the necrotic core, which increases the risk of stent thrombosis. The present disclosure automatically identifies locations satisfying the criterion and displays the morphological assessments of tissue directly on the x-ray image, which advantageously makes tissue classification more accessible, improves the efficiency in the physician's analysis, adds user confidence, and prevents errors.

According to an exemplary embodiment, a system is provided. The system comprises a processor circuit in communication with an intravascular imaging catheter. The processor circuit is operable to: receive an intravascular imaging signal generated by the intravascular imaging catheter while positioned within a blood vessel; perform, using signal processing on the intravascular imaging signal, tissue characterization to identify a plaque component of the blood vessel; generate an intravascular image based on the intravascular imaging signal; receive an extravascular image of a blood vessel obtained by an extravascular imaging device; co-register the intravascular image and the extravascular image to associate the intravascular image with a location of the blood vessel in the extravascular image; determine, using image processing on the intravascular image, if a spatial distribution of the plaque component within the intravascular image satisfies a criterion associated with the spatial distribution; and when the spatial distribution satisfies the criterion, output, to a display in communication with the processor circuit, a screen display comprising: the extravascular image; and a first indicator at the location of the blood vessel in the extravascular image. The first indicator is representative of the spatial distribution of the plaque component.

In some embodiments, the plaque component comprises necrotic core, and the processor circuit determining if the spatial distribution satisfies the criterion comprises determining if the necrotic core comprises 10% or greater of the intravascular image. In some embodiments, the plaque component comprises dense calcium, and the processor circuit determining if the spatial distribution satisfies the criterion comprises determining if the dense calcium is arranged in an arc of 180 degrees or greater. In some embodiments, the first indicator is positioned at adjacent to the blood vessel at the location in the extravascular image. In some embodiments, the screen display comprises the intravascular image. In some embodiments, the intravascular image comprises a virtual histology image, and the screen display comprises a second indicator at the location of the blood vessel in the extravascular image. The second indicator is representative of the virtual histology image at the location. In some embodiments, the processor circuit performing tissue characterization comprises identifying a plurality of plaque components of the blood vessel. The plurality of plaque components comprises dense calcium, necrotic core, fibro-fatty, and fibrous tissue. The plaque component is one of the plurality of plaque components. In some embodiments, the processor circuit is operable to determine if the plaque component is present in the intravascular image after performing the tissue characterization to identify the plurality of plaque components. In some embodiments, the processor circuit is operable to: receive a plurality of intravascular imaging signals; perform tissue characterization on the plurality of intravascular imaging signals to identify the plaque component; generate a plurality of intravascular images based on the plurality of intravascular imaging signals; and co-register, respectively, the plurality of intravascular images to a plurality of locations of the blood vessel in the extravascular image. The processor circuit determining if the spatial distribution satisfies the criterion comprises determining if the spatial distribution satisfies the criterion in two or more of the plurality of intravascular images. In some embodiments, the system further comprises the intravascular imaging catheter. The intravascular imaging catheter comprises an intravascular ultrasound (IVUS) imaging catheter.

According to an exemplary embodiment, a method is provided. The method includes: receiving, with a processor circuit in communication with an intravascular imaging catheter, an intravascular imaging signal generated by the intravascular imaging catheter while positioned within a blood vessel; performing, with the processor circuit, tissue characterization to identify a plaque component of the blood vessel using signal processing on the intravascular imaging signal; generating, with the processor circuit, an intravascular image based on the intravascular imaging signal; receiving, with the processor circuit, an extravascular image of a blood vessel obtained by an extravascular imaging device; co-registering, with the processor circuit, the intravascular image and the extravascular image to associate the intravascular image with a location of the blood vessel in the extravascular image; determining, with the processor circuit, if a spatial distribution of the plaque component within the intravascular image satisfies a criterion associated with the spatial distribution using image processing on the intravascular image; and when the spatial distribution satisfies the criterion, outputting, to a display in communication with the processor circuit, a screen display comprising: the extravascular image; and a first indicator at the location of the blood vessel in the extravascular image. The first indicator is representative of the spatial distribution of the plaque component.

In some embodiments, the plaque component comprises necrotic core, and determining if the spatial distribution satisfies the criterion comprises determining if the necrotic core comprises 10% or greater of the intravascular image. In some embodiments, the plaque component comprises dense calcium, and determining if the spatial distribution satisfies the criterion comprises determining if the dense calcium is arranged in an arc of 180 degrees or greater. In some embodiments, the first indicator is positioned at adjacent to the blood vessel at the location in the extravascular image. In some embodiments, the screen display comprises the intravascular image. In some embodiments, the intravascular image comprises a virtual histology image, and the screen display comprises a second indicator at the location of the blood vessel in the extravascular image. The second indicator is representative of the virtual histology image at the location. In some embodiments, performing tissue characterization comprises identifying a plurality of plaque components of the blood vessel. The plurality of plaque components comprises dense calcium, necrotic core, fibro-fatty, and fibrous tissue. The plaque component is one of the plurality of plaque components. In some embodiments, the method further comprises determining if the plaque component is present in the intravascular image after performing the tissue characterization to identify the plurality of plaque components. In some embodiments, the method further comprises: receiving, with the processor circuit, a plurality of intravascular imaging signals; performing, with the processor circuit, tissue characterization on the plurality of intravascular imaging signals to identify the plaque component; generating, with the processor circuit, a plurality of intravascular images based on the plurality of intravascular imaging signals; and co-registering, with the processor circuit, the plurality of intravascular images, respectively, to a plurality of locations of the blood vessel in the extravascular image. Determining if the spatial distribution satisfies the criterion comprises determining if the spatial distribution satisfies the criterion in two or more of the plurality of intravascular images.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
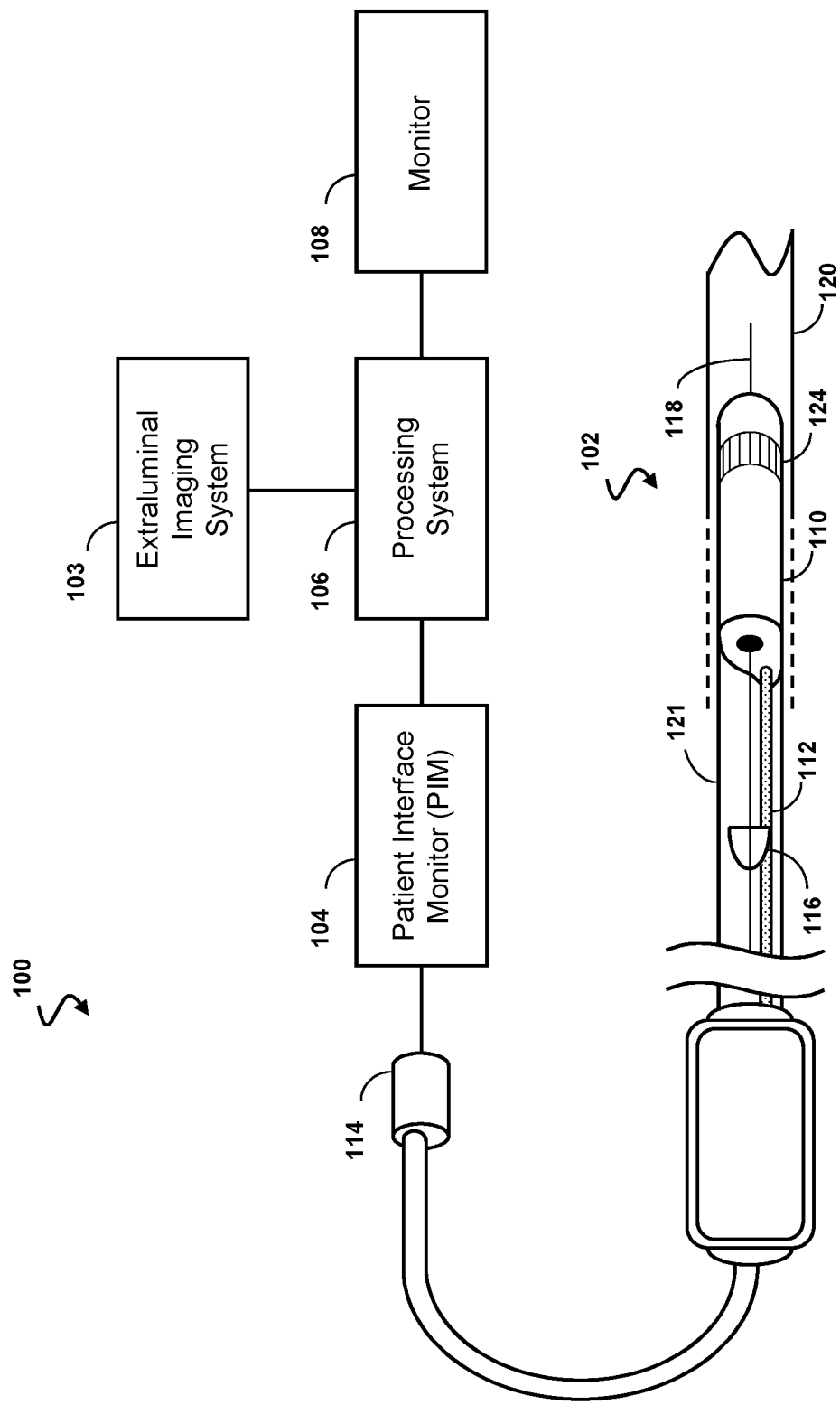
FIG. 1 is a diagrammatic schematic view of an intraluminal imaging system, according to embodiments of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic schematic view of an ultrasound imaging system 100, according to aspects of the present disclosure. The ultrasound imaging system 100 can be an intraluminal imaging system. In some instances, the system 100 can be an intravascular ultrasound (IVUS) imaging system. The system 100 may include an intraluminal imaging device 102 such as a catheter, guide wire, or guide catheter, a patient interface module (PIM) 104, a processing system or console 106, an extraluminal imaging system 103, and a monitor or display 108. The intraluminal device 102 obtains images of a patient's anatomy while positioned within a lumen of the anatomy. The intraluminal imaging device 102 can be an ultrasound imaging device. In some instances, the device 102 can be IVUS imaging device.

At a high level, the IVUS device 102 emits ultrasonic energy, or ultrasound signals, from one or more ultrasound transducer elements 124 included in scanner assembly 110 mounted near a distal end of the flexible elongate member 121. Transducer element(s) 124 can also be referenced as acoustic element(s). The ultrasonic energy is reflected by tissue structures in the medium, such as a vessel 120, or another body lumen surrounding the scanner assembly 110, and the ultrasound echo signals are received by the transducer element(s) 124. In that regard, the device 102 and/or the flexible elongate member 121 can be sized and shaped, structurally arranged, and/or otherwise configured to be positioned within the body lumen of a patient.

In some embodiments, the IVUS device includes some features similar to traditional solid-state IVUS catheters, such as the EagleEye® catheter available from Koninklijke Philips N.V. and those disclosed in U.S. Pat. No. 7,846,101 hereby incorporated by reference in its entirety. For example, the IVUS device 102 includes the scanner assembly 110 near a distal end of the device 102 and a transmission line bundle 112 extending along the longitudinal body of the device 102. The transmission line bundle or cable 112 can include a plurality of conductors, including one, two, three, four, five, six, seven, or more conductors. It is understood that any suitable gauge wire can be used for the conductors. In an embodiment, the cable 112 can include a four-conductor transmission line arrangement with, e.g., 41 AWG gauge wires. In an embodiment, the cable 112 can include a seven-conductor transmission line arrangement utilizing, e.g., 44 AWG gauge wires. In some embodiments, 43 AWG gauge wires can be used.

The transmission line bundle 112 terminates in a PIM connector 114 at a proximal end of the device 102. The PIM connector 114 electrically couples the transmission line bundle 112 to the PIM 104 and physically couples the IVUS device 102 to the PIM 104. In an embodiment, the IVUS device 102 further includes a guide wire exit port 116. Accordingly, in some instances, the IVUS device 102 is a rapid-exchange catheter. The guide wire exit port 116 allows a guide wire 118 to be inserted towards the distal end in order to direct the device 102 through the vessel 120. In some instances, the IVUS device 102 is an over the wire catheter, and the guide wire 118 extends within the IVUS device 102 from the proximal portion to the distal portion of the IVUS device 102, for completely or nearly completely the entire length of the IVUS device 102.

The scanner assembly 110 can include one or more acoustic elements 124 configured to emit ultrasound energy and receive echoes corresponding to the emitted ultrasound energy. In some embodiments, the scanner assembly 110 can include a single acoustic element 124. In some embodiments, the scanner assembly 110 can include an array of acoustic elements 124. In some instances, the ultrasound transducer array may include any number of ultrasound transducer elements. For example, the array can include between 2 acoustic elements and 1000 acoustic elements, including values such as 2 acoustic elements, 4 acoustic elements, 32 acoustic elements, 64 acoustic elements, 128 acoustic elements, 500 acoustic elements, 812 acoustic elements, and/or other values both larger and smaller. In some instances, the transducer elements of the array may be arranged in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5D array), or a two-dimensional (2D) array. The array of transducer elements (e.g., one or more rows, one or more columns, and/or one or more orientations) can be uniformly or independently controlled and activated. The array can be configured to obtain one-dimensional, two-dimensional, and/or three-dimensional images of patient anatomy.

The ultrasound transducer elements may include piezoelectric/piezoresistive elements, piezoelectric micromachined ultrasound transducer (PMUT) elements, capacitive micromachined ultrasound transducer (CMUT) elements, and/or any other suitable type of ultrasound transducer elements. The ultrasound transducer elements of the array are in communication with (e.g., electrically coupled to) electronic circuitry. For example, the electronic circuitry can include one or more transducer control logic dies. The electronic circuitry can include one or more integrated circuits (IC), such as application specific integrated circuits (ASICs). In some embodiments, one or more of the ICs can include a microbeamformer (µBF). In other embodiments, one or more of the ICs includes a multiplexer circuit (MUX).

In some embodiments, the one or more transducer elements 124 are fixed relative to the flexible elongate member 121. In some embodiments, the imaging device 102 is a rotational catheter such that the one or more transducer elements 124 rotates relative to the flexible elongate member 121. The flexible elongate member 121 can include a flexible drive cable extending along a length of the catheter and configured to rotate about a longitudinal axis of the catheter. The scanner assembly 110 can include a housing in which one or more transducer element(s) 124 are positioned. The housing can be coupled to the drive cable such that the transducer element(s) 124 rotate with the drive cable. The catheter can also include circuitry associated with the transducers and/or mounted near the distal tip of the catheter, an electrical cable with one, two, three, four or more conductors, and the appropriate connector at the proximal portion to support mechanical and/or electrical interconnection at a rotational interface. The distal portion of the catheter is positioned within the anatomy of the patient. The proximal portion of the catheter is mechanically and/or electrically coupled to a movement device of the system. The movement device includes one or more motors, associated circuitry, and/or other suitable components structurally arranged to impart rotational and/or longitudinal movement to one or more components of the catheter, such as a drive cable. The movement device can be referenced as a pullback device and/or a sled in some instances. In some embodiments, the movement device and the PIM can be combined in single device. In other embodiments, the system 100 includes a PIM distinct from the movement device.

In some embodiments, the imaging device 102 is an intravascular and/or intraluminal optical coherence tomography (OCT) device including an OCT imaging assembly (e.g., optical fiber, lens, prism, etc.) configured to obtain OCT images of the body lumen. For example, the OCT imaging assembly can output optical signals to the PIM 104 and/or the processing system 106. In some embodiments, aspects of the present disclosure can be implemented in intraluminal ultrasound imaging systems using an intracardiac (ICE) echocardiography catheter and/or a transesophageal echocardiography (TEE) probe.

The PIM 104 facilitates communication of signals between the IVUS console 106 and the scanner assembly 110 included in the IVUS device 102. This communication includes the steps of: (1) providing commands to integrated circuit controller chip(s) included in the scanner assembly 110 to select the particular transducer array element(s), or acoustic element(s), to be used for transmit and receive, (2) providing the transmit trigger signals to the integrated circuit controller chip(s) included in the scanner assembly 110 to activate the transmitter circuitry to generate an electrical pulse to excite the selected transducer array element(s), and/or (3) accepting amplified echo signals received from the selected transducer array element(s) via amplifiers included on the integrated circuit controller chip(s) of the scanner assembly 110. In some embodiments, the PIM 104 performs preliminary processing of the echo data prior to relaying the data to the console 106. In examples of such embodiments, the PIM 104 performs amplification, filtering, and/or aggregating of the data. In an embodiment, the PIM 104 also supplies high- and low-voltage DC power to support operation of the device 102 including circuitry within the scanner assembly 110.

In some embodiments, the PIM generates the required sequence of transmit trigger signals and control waveforms to regulate the operation of the circuitry associated with the transducers, and processes the amplified echo signals received over the conductors of the electrical cable. The PIM 150 also supplies the high- and low-voltage DC power supply to support operation of the transducers. In that regard, the PIM is structurally arranged to DC supply voltages to the circuitry of the catheter across a rotational interface, using slip rings and/or the implementation of the active spinner technology described in U.S. Pat. No. 8,403, 856, which is hereby incorporated by reference in its entirety. In some embodiments, the PIM supplies AC voltage to the transducers using, e.g., a rotary transformer.

The PIM 104 transfers the received echo signals to the console or computer 106 where the ultrasound image (including the flow information) is reconstructed and displayed on the monitor 108. The console or computer 106 can include processing circuit having a processor and a memory in communication with the processor. The computer or computing device 106 can be operable to facilitate the features of the IVUS imaging system 100 described herein. For example, the processor can execute computer readable instructions stored on the non-transitory tangible computer readable medium.

The IVUS console 106 receives the echo data from the scanner assembly 110 by way of the PIM 104 and processes the data to reconstruct an image of the tissue structures in the medium surrounding the scanner assembly 110. The console 106 outputs image data such that an image of the vessel 120, such as a cross-sectional image of the vessel 120, is displayed on the monitor 108. Vessel 120 may represent fluid filled or surrounded structures, both natural and man-made. The vessel 120 may be within a body of a patient. The vessel 120 may be a blood vessel, as an artery or a vein of a patient's vascular system, including cardiac vasculature, peripheral vasculature, neural vasculature, renal vasculature. In general, the any suitable body lumen 120 inside the body can be imaged using the intraluminal imaging device 102. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 102 may be used to examine man-made structures such as, but without limitation, heart valves, stents, shunts, filters and other devices.

Figure 4:
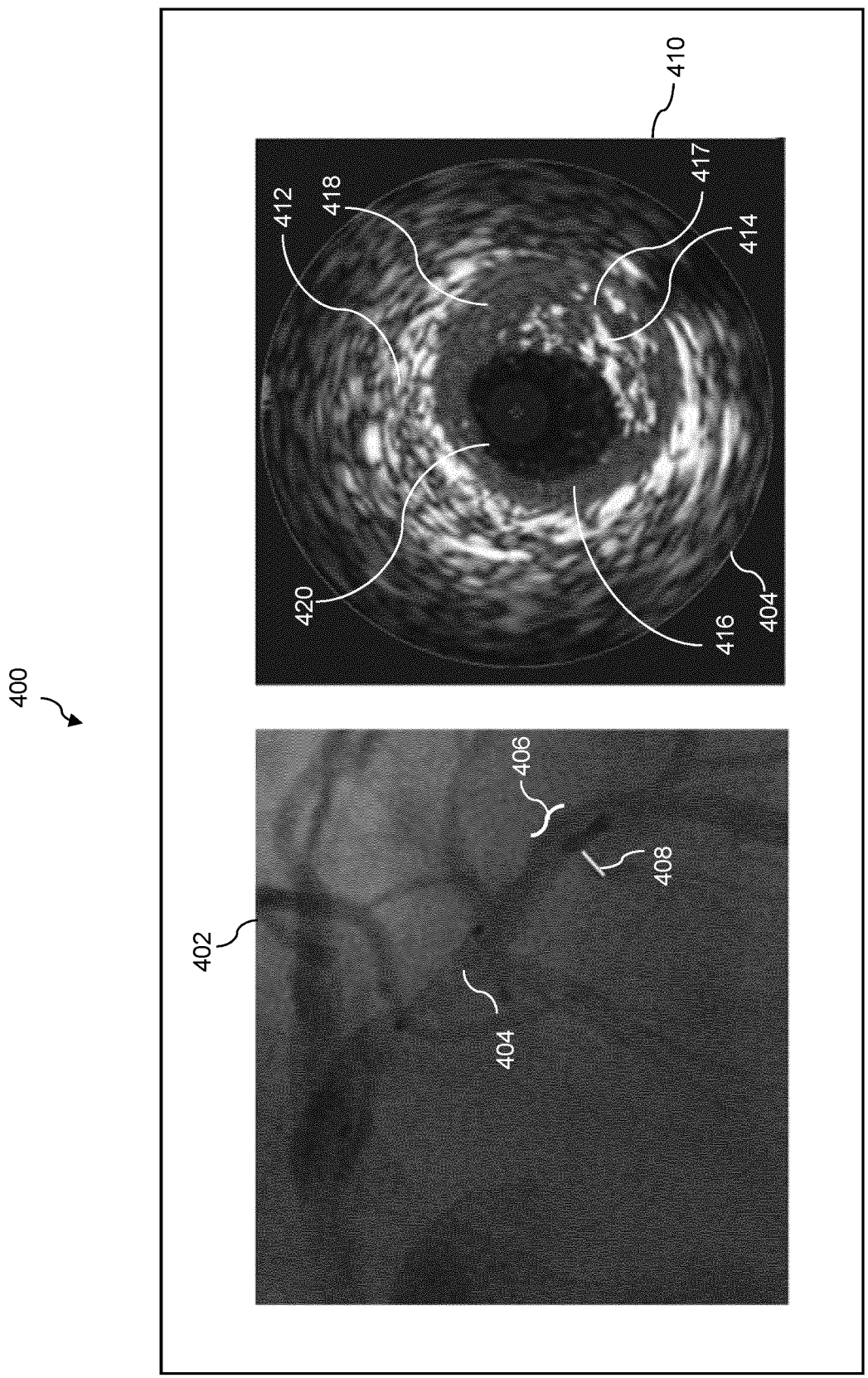
FIG. 4 is a diagrammatic view of a screen display with angiographic and IVUS images, according to embodiments of the present disclosure.

In an embodiment, the processing system 106 generates flow data by processing the echo signals from the IVUS device 102 into Doppler power or velocity information. The processing system 106 may also generate B-mode data by applying envelope detection and logarithmic compression on the conditioned echo signals. The processing system 106 can further generate images in various views, such as 2D and/or 3D views, based on the flow data or the B-mode data. The processing system 106 can also perform various analyses and/or tissue assessments on the obtained ultrasound data. For example, the processing system 106 can apply virtual histology (VH) techniques to analyze and/or assess tissue characteristics within a vessel (e.g., the vessel 120). Execution of VH techniques can also be referenced as tissue characterization. The processing system 106 can include hardware and/or software operable to identify one or more types of plaque within the vessel wall, as well as the respective locations of the one or more types of plaque within the vessel wall. The processing system 106 creates a VH image of the interrogated vessel 120, which identifies regions in the vessel wall corresponding to the one or more plaque types. In some examples, the VH image can be in the form of color-coded tissue map of plaque composition. The VH image can be superimposed on a cross-sectional B-mode image of the vessel 120. The processing system 106 may identify a region of interest (ROI) on the VH image and identify a corresponding region on the B-mode image using various algorithms including warping and/or morphing the VH image to substantially fit the contour of the B-mode image. The processing system 106 can provide a combined image including the B-mode image and the VH image to the display 108. FIG. 4 shows example of the VH image 410, which includes the VH color map as an overlay on top of the B-mode IVUS image.

The processing system 106 can be directly or indirectly in communication with the extraluminal imaging system 103 that obtains extraluminal images of a body lumen. In some embodiments, the extraluminal imaging system 103 includes an imaging device and/or processing hardware and software to control operation of the imaging device and/or generate the extraluminal image. The extraluminal imaging system 103 can be an extravascular imaging system that obtains extravascular imagines of a blood vessel. In some embodiments, the processing system 106 is a single housing. The single housing can include processing hardware and software associated with both intravascular imaging and extravascular imaging. In some embodiments, the processing system 106 includes multiple housings in communication with one another. One housing can include processing hardware and software associated with intravascular imaging. Another housing can include processing hardware and software associated with extravascular imaging. In such instances, a processing system can be associated with intravascular imaging, and another processing system can be associated with extravascular imaging.

The processing system 106 receives extravascular images from the extravascular imaging device 103. The extravascular imaging device 103 can obtain images of the body lumen while positioned outside of the patient's body. The processing system 106 can generate extravascular images from data obtained by the extravascular imaging device 103. For example, the processing system 106 can receive and process electrical signals from the extravascular imaging device that are representative of the anatomy in the extravascular image and output an extravascular image. In some instances, the extravascular imaging device 103 and/or a processing system associated with the extravascular imaging device generates the extravascular images and transmits the extravascular images to the processing system 106. Examples of extravascular imaging devices include x-ray, angiography, fluoroscopy, computed tomography (CT), and/or magnetic resonance imaging (MRI) devices. Angiography or arteriography imaging technique is used to visualize the inside of a lumen in blood vessels and other organs of the body, with particular interest in the arteries, veins, and the heart chambers. This is traditionally done by injecting a radio-opaque contrast agent into the blood vessel and imaging using x-ray based techniques. Angiogram is an image of the vessel with contrast media such that the contour of the vessel is visible in the x-ray image. For example, angiography can be any suitable type, including digital subtraction angiography. Fluoroscopy uses x-rays to obtain real-time moving images of the interior of a vessel. In some instances, fluoroscopy is performed without injection of the contrast agent. One or more these techniques allow the interventional radiologist or cardiologist to see stenosis (blockages or narrowing) inside the vessel which may be inhibiting the flow of blood and causing pain.

Intravascular imaging, including tissue characterization, can be cooperatively utilized with extravascular imaging. The processing system 106 can also include hardware and/or software to perform co-registration of the extravascular images and the intravascular images. Co-registration advantageously allows the location where the intravascular image was obtained to be identified and displayed in an extravascular image. For example, co-registration can include spatially relating an angiogram of a vessel to fluoroscopic images obtained while the intravascular device 102 obtains intravascular images while being moved through the vessel. Based on the fluoroscopic images, the processing system 106 records the locations in the vessel at which the intravascular device 102 obtains the intravascular images. By spatially relating the fluoroscopic images to the angiogram, the processing system 106 determines the locations at which at the intravascular images are obtained in the angiogram.

Figure 2:
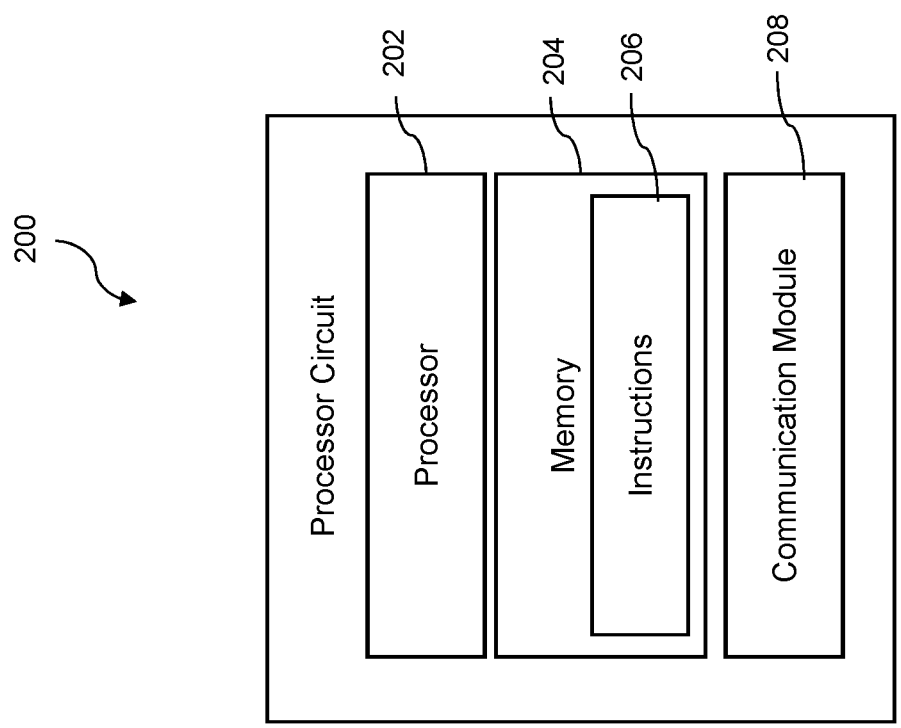
FIG. 2 is a diagrammatic schematic view of a processor circuit, according to embodiments of the present disclosure.

FIG. 2 is a schematic diagram of a processor circuit 200, according to embodiments of the present disclosure. The processor circuit 200 may be implemented in the processing system 106, the PIM 104, the imaging device 102, and/or the extraluminal imaging system 103 of FIG. 1. As shown, the processor circuit 200 may include a processor 202, a memory 204, and a communication module 208. These elements may be in direct or indirect communication with each other, for example via one or more buses.

The processor 202 may include a central processing unit (CPU), a digital signal processor (DSP), an ASIC, a controller, an FPGA, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the processing system 106 and/or the imaging device 102 (FIG. 1). Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 208 can include any electronic circuitry and/or logic circuitry to facilitate direct or indirect communication of data between the processor circuit 200, the imaging device 102, and/or the monitor 108. In that regard, the communication module 208 can be an input/output (I/O) device. In some instances, the communication module 208 facilitates direct or indirect communication between various elements of the processor circuit 200 and/or the processing system 106 (FIG. 1).

Figure 3:
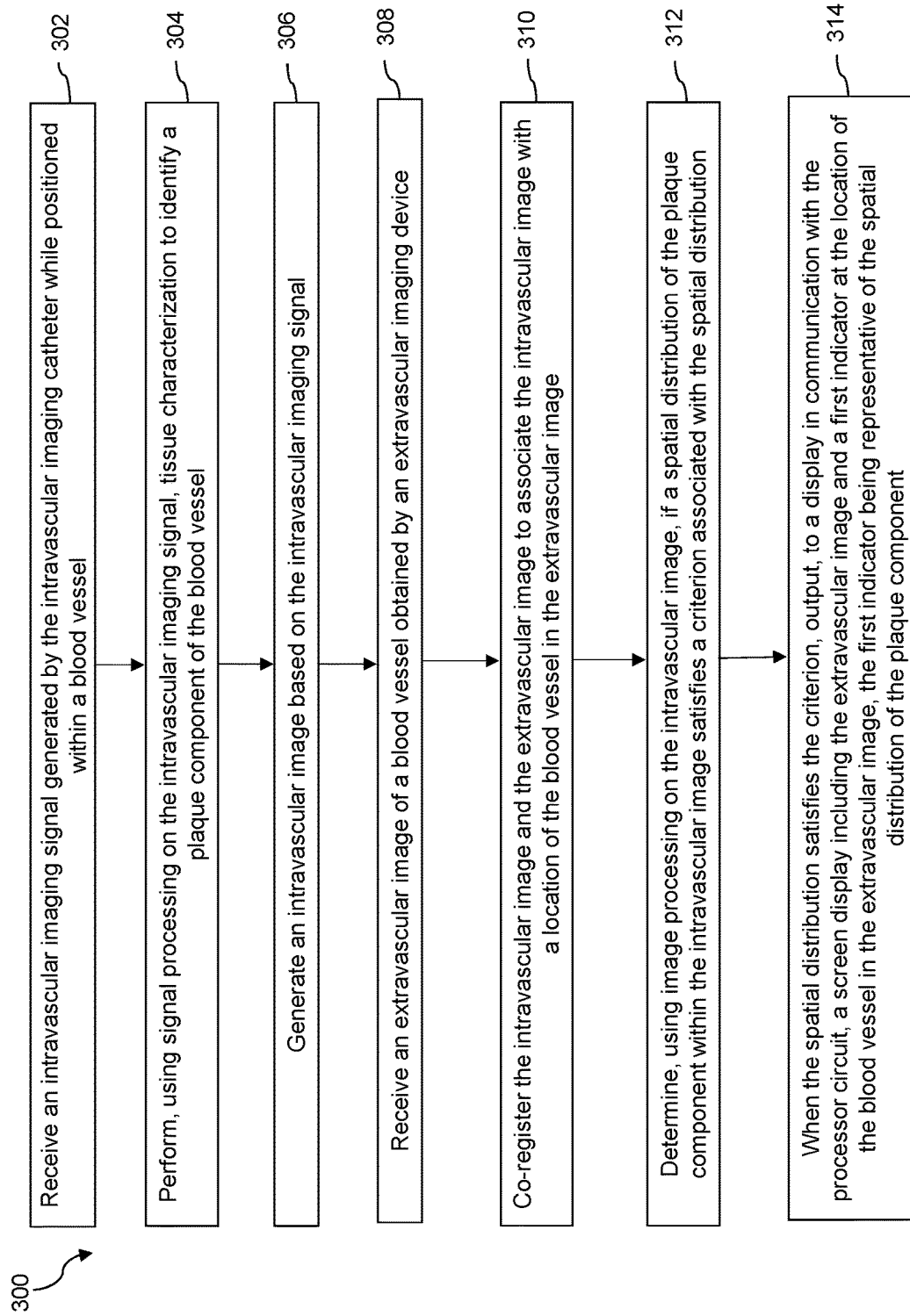
FIG. 3 is a flow diagram of a method for determining the spatial distribution of plaque within a vessel, according to embodiments of the present disclosure.

FIG. 3 is a flow diagram of a method 300 including exemplary steps to determine the spatial distribution of plaque within a vessel, according to an embodiment of the present disclosure. In some embodiments, the steps of the method 300 may be carried out by one or more of the components of the imaging system 100 (FIG. 1) and/or the processor circuit 200 (FIG. 2). It is understood that the steps of method 300 may be performed in a different order than shown in FIG. 3, additional steps can be provided before, during, and after the steps, and/or some of the steps described can be replaced or eliminated in other embodiments.

Figure 5:
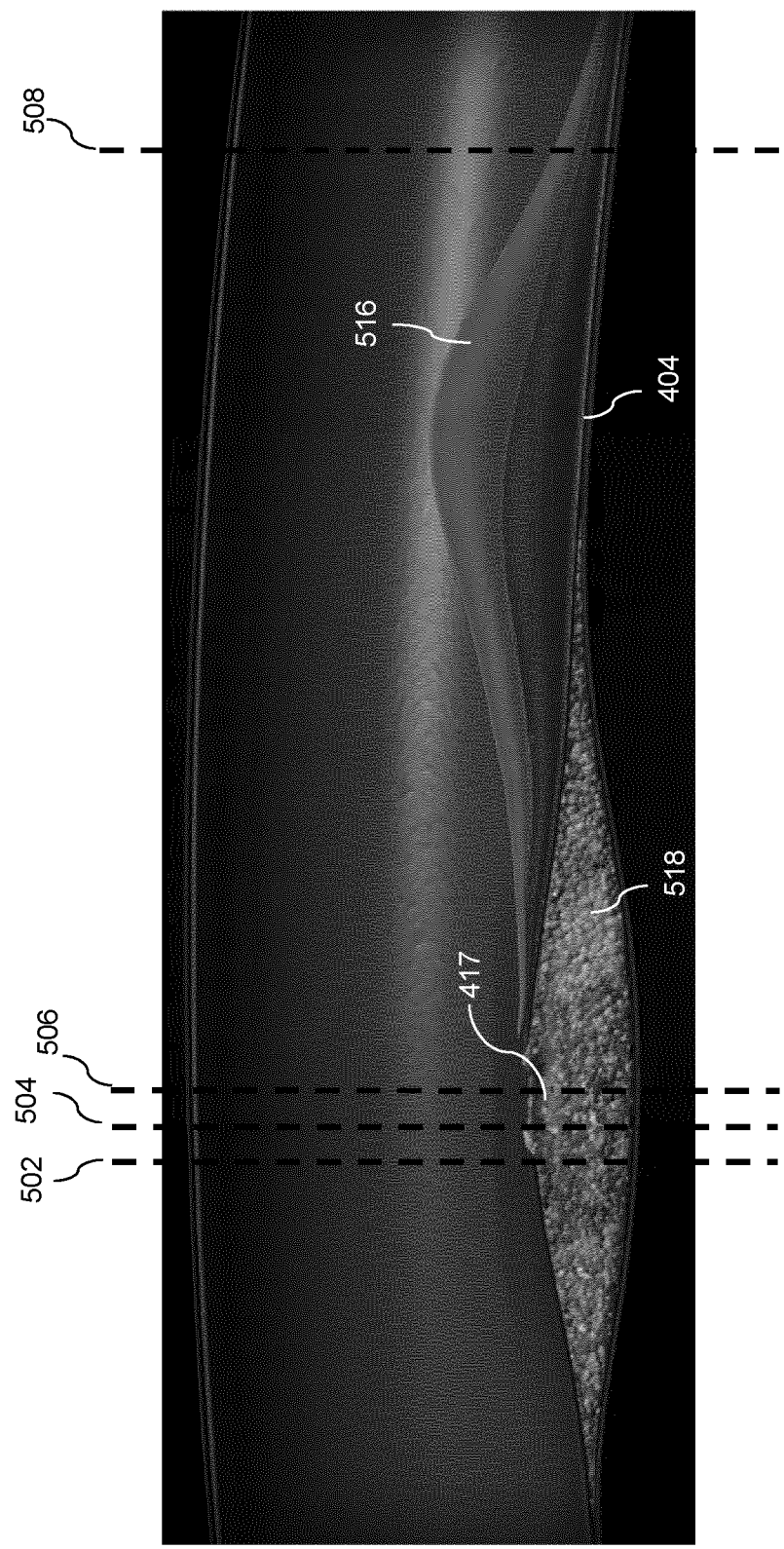
FIG. 5 is a diagrammatic cross-sectional side view of a vessel including a necrotic core, according to embodiments of the present disclosure.
Figure 6:
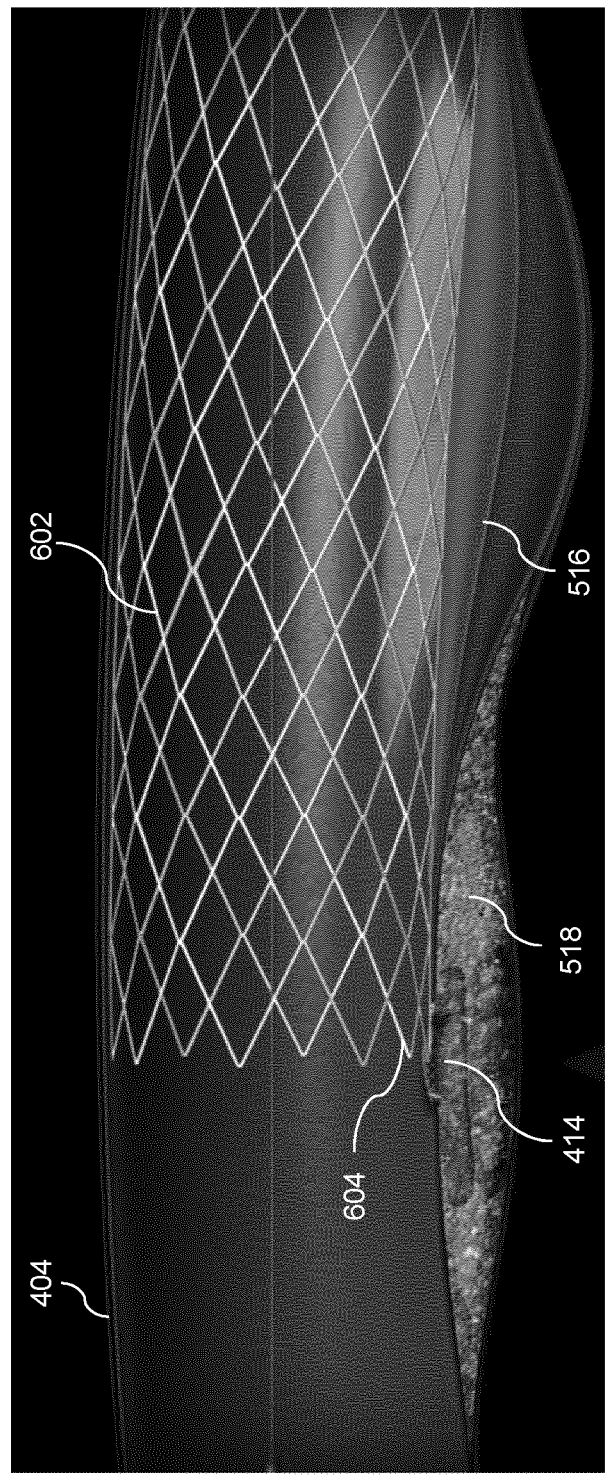
FIG. 6 is a diagrammatic cross-sectional side view of the vessel of FIG. 5 including a stent positioned such that the necrotic core is uncovered, according to embodiments of the present disclosure.
Figure 7:
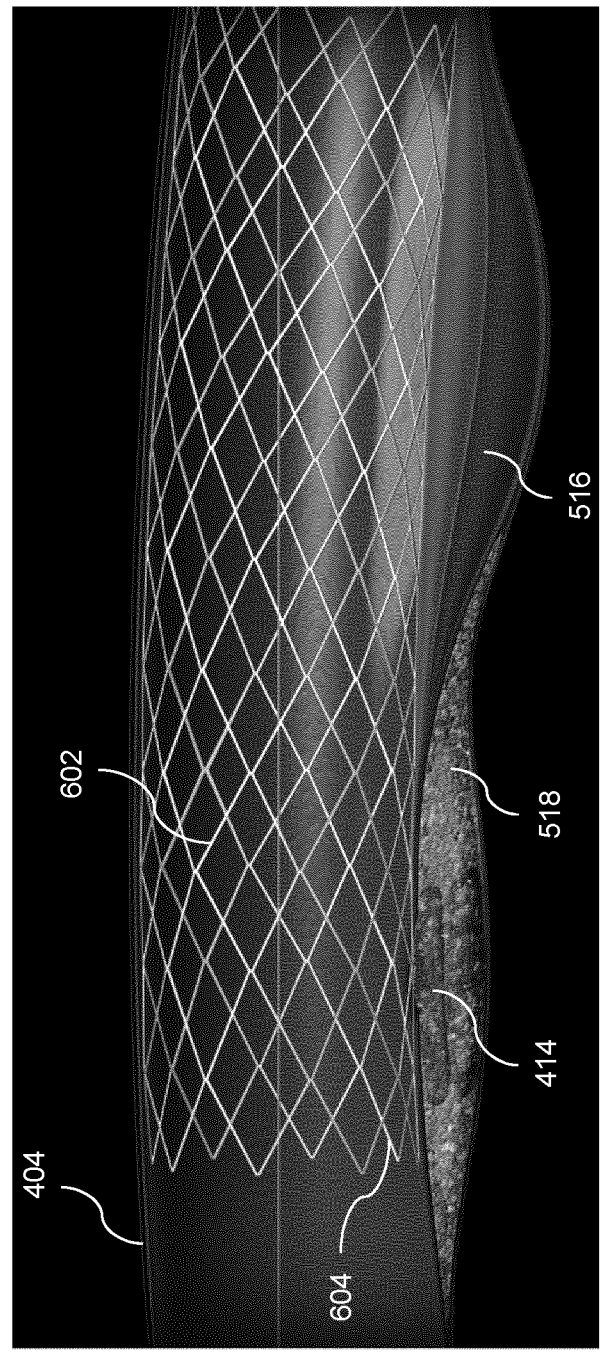
FIG. 7 is a diagrammatic cross-sectional side view of the vessel of FIG. 5 including a stent positioned such that the necrotic core is covered, according to embodiments of the present disclosure.
Figure 8:
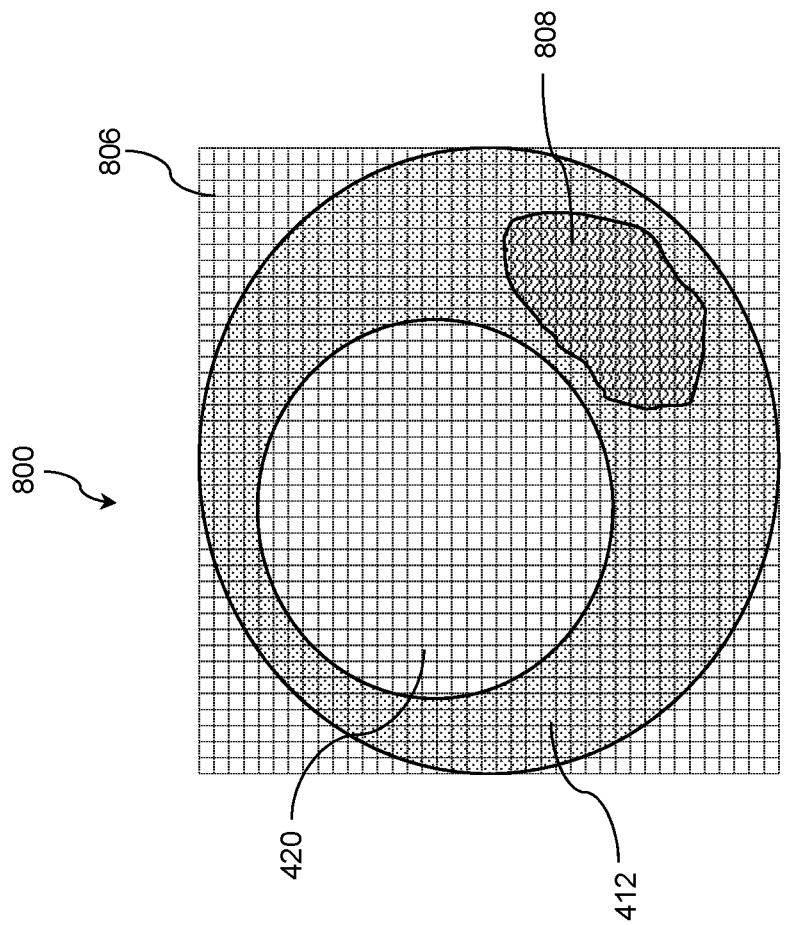
FIG. 8 is a diagrammatic view of an IVUS image showing a spatial distribution of necrotic core, according to embodiments of the present disclosure.
Figure 9:
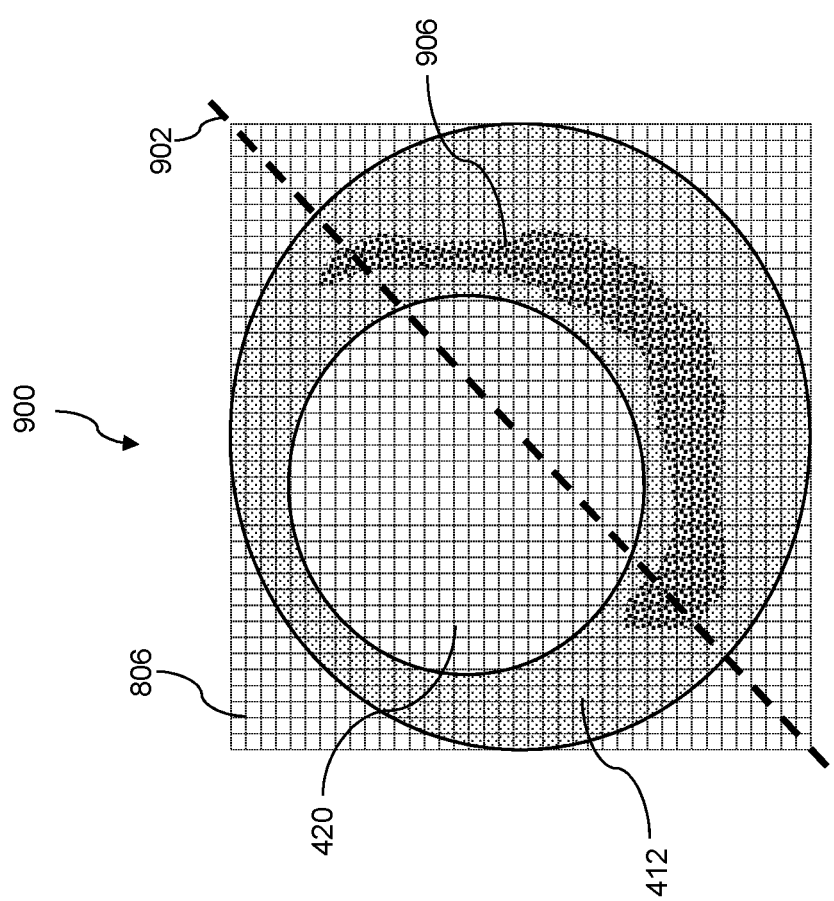
FIG. 9 is a diagrammatic view of an IVUS image showing a spatial distribution of dense calcium, according to embodiments of the present disclosure.

The method 300 will be described with reference to FIGS. 4-9. FIG. 4 is a diagrammatic view of a screen display 108 with angiographic image 402 and IVUS image 410, according to embodiments of the present disclosure. FIG. 5 is a diagrammatic cross-sectional side view of a vessel including a necrotic core, according to embodiments of the present disclosure. FIG. 6 is a diagrammatic cross-sectional side view of the vessel of FIG. 5 including a stent positioned such that the necrotic core is uncovered, according to embodiments of the present disclosure. FIG. 7 is a diagrammatic cross-sectional side view of the vessel of FIG. 5 including a stent positioned such that the necrotic core is covered, according to embodiments of the present disclosure. FIG. 8 is a diagrammatic view of an IVUS image 800 showing a spatial distribution necrotic core 808, according to embodiments of the present disclosure. FIG. 9 is a diagrammatic view of an IVUS image 900 showing a spatial distribution of dense calcium 906, according to embodiments of the present disclosure.

Referring now to FIG. 3, at step 302, the method 300 includes receiving an intravascular imaging signal generated by the intravascular imaging catheter while positioned within a blood vessel. For example, the intravascular imaging catheter can be the imaging device 102 (FIG. 1), and the blood vessel may be the blood vessel 120 and/or the blood vessel 404 (FIGS. 4-7). The imaging catheter 102 can obtain imaging data at one or more positions within the blood vessel (e.g., locations 502, 504, 506, 508 of FIG. 5). For example, the imaging catheter 102 obtains imaging data while being moved longitudinally through the blood vessel, either manually by the clinician or mechanically by, e.g., a pullback device. Step 302 can include a processor circuit, such as the processor circuit 200, activating and/or otherwise controlling one or more transducer elements of the intravascular imaging catheter to obtain ultrasound data. The one or more transducer elements can output electrical signals representative of the echoes reflected from anatomy within the vessel, which is received by the processing system 106.

At step 304, the method 300 includes perform, using signal processing on the intravascular imaging signal, tissue characterization to identify a plaque component of the blood vessel. For example, the intravascular imaging data can be processed by the intravascular imaging system 100 and/or the processing system 106 to extract tissue characterization features. The tissue characterization features can be plaque components (e.g., fibrous, fibro-fatty, dense calcium and necrotic core) within the vessel 404. The method 300 including the processing system 106 receiving focused radio frequency (RF) backscatter data, for example, corresponding to the RF data provided by the intraluminal imaging device 102. The RF data is time-domain signal data including a plurality of scan lines representing the vessel under ultrasound examination. The method 300 including the processing system 106 determining a region of interest (ROI) from the RF data. The method 300 may use any suitable border detection (e.g., automatic border detection) techniques for determining the ROI. The method 300 converts the time-domain RF data to a frequency domain. Different types and densities of tissue may absorb and reflect the ultrasound waves differently. Thus, the RF data includes characteristics of the types of tissue in the vessel under ultrasound examination. Accordingly, differences in the RF data along each scan line can be determined by performing frequency analysis on the RF data. The frequency analysis can use any suitable techniques including spectral analysis, autoregressive (AR) modelling, wavelet decomposition, and/or curvelet decomposition. More recently, the radio frequency signal from the backscatter data has been gathered and correlated with known histology data to permit further analysis and classification of the vasculature. The virtual histology (VH) technology, described above, also provides the ability to identify boundary features within the vasculature and plaque and to determine the composition of each patient's atherosclerotic plaques from the RF backscatter data. Currently, VH mapping is accomplished by transforming the RF backscatter signal from an IVUS catheter into the frequency domain. Next step is analyzing various power spectral characteristics to classify tissue in windows along each IVUS scan line according to a database, or classification tree. The database contains the specific spectrum RF signals for four plaque types: fibrous, fibro-fatty, dense calcium and necrotic core. Using this technology, VH images generated from IVUS data can show the four plaque component types. In some embodiments, step 304 of the method 300 may employ algorithms for tissue characterization data generation and/or tissue characterization similar or identical to those disclosed in U.S. Pat. No. 7,074,188, U.S. Patent Application Publication No. 2014/0163369, and "Coronary Plaque Classification With Intravascular Ultrasound Radiofrequency Data Analysis" by Anuja Nair, Barry D. Kuban, E. Murat Tuzcu, Paul Schoenhagen, Steven E. Nissen, D. Geoffrey Vince, Circulation. 2002; 106: 2200-2206, each of which is hereby incorporated by reference in its entirety. In other embodiments, tissue characterization can be performed using any suitable process with signal processing on the intravascular imaging signal and/or image processing on the imaging data generated from the intravascular imaging signal. For example, the processor circuit can determine whether one, two, three, four, or more plaque types are present within a vessel wall in an intravascular image using any suitable signal processing and/or image processing.

At step 306, the method 300 includes generating intravascular image based on the intravascular imaging signal received in step 302. For example, the image can be a B-mode IVUS image, according to an embodiment of the present disclosure. Generating the IVUS image can include transforming the imaging signal from the IVUS device 102 into display data. The processing system 106 can perform beamforming, image processing, display processing, scan conversion, etc., to generate the IVUS image 410. The IVUS image 410 shows cross-sectional or tomographic view of the vessel wall 412 and the lumen 420 as illustrated in FIG. 4. Because the IVUS image 410 has also undergone tissue characterization, the IVUS image 410 includes a color map of different plaque components within the vessel wall 412. The compositions of each plaque component can be identified by corresponding colors in the IVUS image 410, such as dark green for fibrous 416, light green for fibro-fatty 418, white for dense calcium 414, and red for necrotic core 417.

At step 308, the method 300 includes receiving an extravascular image of a blood vessel. For example, the processing system 106 can receive the extravascular image from the extravascular imaging device 103. The extravascular image can be an angiogram image 402, as illustrated in FIG. 4, which is an x-ray image of the blood vessel 404. In various embodiments, the extravascular image can be a 2D image or a 3D image of the vessel. Step 308 can include acquiring and generating the extravascular image by the extravascular imaging device 103.

At step 310, the method 300 includes co-registering the IVUS image 410 and the extravascular image 402. Step 310 can include spatially relating the location in the vessel where the IVUS image 410 was obtained to the corresponding location in the extravascular image 402. The IVUS image 410 includes the tissue characterization information (e.g., the types and location of one or more plaque components). Accordingly, step 310 also correlates the tissue characterization information in the IVUS image 410 to the corresponding location in the extravascular image 402. For example, the types and location of plaque at the location of the vessel in the extravascular image 402 are identified. In the illustrated embodiment of FIG. 4, the marking 406 is example showing how the presence of a feature of interest along the vessel is identified. Aspects of co-registration are described, for example, in U.S. Pat. Nos. 7,930,014 and 8,298,147, the entireties of which are hereby incorporated by reference in its eternity.

At step 312, method 300 includes determining, using image processing on the intravascular image, if a spatial distribution of the plaque component within the intravascular image, satisfies a criterion associated with the spatial distribution. In an exemplary embodiment, step 312 can combine co-registration techniques with computational or machine learning technique to determine if the spatial distribution satisfies the criterion. In general, the criterion can be related to the structure, location, orientation, size, shape, and/or other physical property of the vessel wall, vessel lumen, and/or one or more plaque types within the vessel wall. Exemplary criteria include greater than 180 degrees of superficial dense calcium, greater than 270 degrees of superficial dense calcium, thin capped fibroatheroma (TCFA) phenotypes rich in necrotic core (e.g., 10% or greater of vessel wall is necrotic core), and/or fresh or organized thrombus. Step 312 can include a single criterion or a combination of two, three, four, or more criteria. The processing system 106 can carry out image analysis on image data generated from the obtained IVUS signal data and/or signal analysis on the obtain IVUS signal data to determine if the criterion is satisfied. In some embodiments, step 312 determines if a single image frame satisfies the criterion. In some embodiments, step 312 determines if a plurality of image frames (e.g., two, three, four, or more) satisfy the criterion. The plurality of image frames can be adjacent images frames in some embodiments. For example, in some embodiments, a criterion is said to be satisfied when two, three, four or more adjacent image frames all satisfy the given criterion.

Example criteria are illustrated in FIGS. 8 and 9. FIG. 8 illustrates an IVUS image 800 that satisfies a spatial distribution criterion of 10% or greater presence of necrotic core 808 in the vessel wall 412. FIG. 8 shows the vessel wall 412 with the lumen 420. The vessel wall 412 includes an occlusion of the lumen, due to the plaque formation with necrotic core 808. The grid lines 806 illustrate pixels in the IVUS image 800. In order to determine if the spatial distribution criterion is met (e.g., does the necrotic core 808 constitute 10% or greater of the vessel wall 412, the processing system 106 can carry out a pixel by pixel image analysis to determine which pixels are the necrotic core 808, how many total pixels are the necrotic core 808, and how many total pixels form the vessel wall 412, and then calculate the percentage of the necrotic core pixels out of the total pixels in the vessel wall 412. Any suitable percentage (e.g., 0%, 5%, 10%, 20%, 25%, 30%, 40%, 50%, 60%, 70%, 75%, 80%, 90%, 95%, 100%, and/or other values) of any plaque type within the vessel wall 412 is contemplated as a criterion.

FIG. 9 illustrates an IVUS image 900 that satisfies a spatial distribution criterion representing the presence of arcs of dense calcium 906 (e.g., an arc of 180 degrees or greater) within the vessel wall 412. FIG. 9 shows the vessel wall 412 with the lumen 420. The vessel wall 412 includes an occlusion of the lumen, due to the plaque formation with dense calcium 906. The grid lines 806 illustrate pixels in the IVUS image 900. An exemplary axis 902 extends through a center point in the IVUS image 900, bisecting the IVUS image. In order to determine if the spatial distribution criterion is met (e.g., is the dense calcium 906 formed in an arc of 180 degrees or greater), the processing system 106 can carry out a pixel by pixel image analysis to determine which pixels are the dense calcium 906 and if there is a contiguous set of pixels that extend 180 degrees around the vessel wall 412, relative to any axis extending across the IVUS image 900 (e.g., the axis 902). Any suitable arc angle is contemplated (e.g., 0 degrees, 30 degrees, 45 degrees, 60 degrees, 90 degrees, 120 degrees, 135 degrees, 150 degrees, 180 degrees, 210 degrees, 225 degrees, 240 degrees, 270 degrees, 300 degrees, 315 degrees, 330 degrees, 360 degrees, and/or other values) of any plaque type within the vessel 412 is contemplated as a criterion.

At step 314, the method 300 includes, when the spatial distribution criterion is satisfied, outputting to the monitor 108 that is in communication with the processing system 106, a screen display (e.g., all or a portion of the screen display 400 of FIG. 4). The processing system 106 can generate and output the screen display to the monitor 108. For example, as shown in FIG. 4, the screen display 400 includes the extravascular image 402 and an indicator 408 at the location of the blood vessel 404 in the extravascular image 402 that satisfies the criterion in step 312. The extravascular image 402 can be a 2D or 3D image including the vessel 404. In some embodiments, the extravascular image 402 is a 2D or 3D rendering of the vessel 404. The extravascular image 402 can be based wholly or partially imaging data obtained by the extravascular imaging device 103 (e.g., x-ray image data from an x-ray imaging device). By way of example, the angiographic image 402 itself is displayed. In another embodiment, information from the extravascular image is only used to guide piece-wise reconstruction of the imaged vessel 404 to generate a 2D or 3D rendering.

In general, the indicator 406 can alert the user, such as the physician, to the composition of the vessel tissue at the location. In this manner, the user can consider the IVUS image and/or the VH data at that location when making decisions regarding treatment of the vessel 404. For example, the indicator 406 can be representative of the spatial distribution of the plaque component corresponding to the criterion in step 312. The indicator 406 can be a graphic overlaid on the extravascular image 402. In some embodiments, the indicator 406 is part of the extravascular image 402 generated by the extravascular imaging device 103 and/or the processing system 106. The indicator 406 can be positioned over, adjacent, and/or otherwise proximate to the vessel 404 (e.g., the location along the length of the vessel where the criterion is satisfied). In that regard, different locations along the length of the vessel (e.g., locations 502, 504, 506, 508 of FIG. 5) can correspond to different IVUS image frames. The indicator 406 can be any suitable graphical, symbolic, alphabetical, and/or numerical display. In the illustrated embodiment of FIG. 4, the indicator 406 is a curved line segment or a tilde. Any suitably shaped symbol, such as a circle, square, diamond, etc., is contemplated. In some embodiments, the indicator 406 is color coded. As described above, different plaque types can be respectively associated with a different color in the IVUS image 410. The color of the indicator 406 in the extravascular image 402 can be one of the colors used to identify the different plaque types in the IVUS image 410 (dark green for fibrous 416, light green for fibro-fatty 418, white for dense calcium 414, and red for necrotic core 417). For example, the color of the indicator 406 can correspond to the criterion in step 312. When the criterion in step 312 is related to a particular plaque type, the indicator 406 can be color corresponding to that plaque type. In that regard, when the criterion relates to necrotic core, the indicator 406 is red. When the criterion relates to dense calcium, the indicator 406 is white. When step 312 includes two or more criteria, the indicator 406 can be a combination of colors or a different color. Any suitable color or combinations thereof are contemplated. The coloring of the indicator 406 can visually accentuate the location on the extravascular image 402. For example, a red or white color for the indicator 406 visually accentuates the indicator 406 against the grayscale angiogram 402. While the extravascular image 402 in FIG. 4 includes one indicator 406, it is understood that the extravascular image 402 can include two, three, four, or more indicators 406.

The screen display 400 can include the IVUS image 410. The IVUS image 410 can be provided adjacent to or otherwise proximate to the extravascular image 402. For example, the IVUS image 410 and the extravascular image 402 can be provided in the same user interface element or different user interface elements of the screen display 400. In some embodiments, the user can select any location along the length of the vessel 404 in the extravascular image 402, and the IVUS image 410 corresponding to that location is provided in the screen display 400. The IVUS image 410 can correspond to the location of the indicator 406. In this manner, the IVUS image 410 and the tissue characterization information contained therein is advantageously linked to the extravascular image 402. This allows the physician to easily understand the plaque composition at that location of the vessel (e.g., using the IVUS image 410), as well as more easily understand where that location is along the length of the vessel (e.g., using the extravascular image 402). The screen display 400 provides an indication of key anatomical or morphological findings right on the angiogram image 402, at the corresponding location of the vessel 404, making the physician's workflow more simplified and streamlined. Conventional systems do not link the VH-IVUS image directly with the angiogram.

In some embodiments, the screen display 400 additionally includes an indicator 408. The indicator 408 can identify a location along the vessel 404 at which tissue characterization or VH information is available. Based on the intraluminal imaging data obtained by the imaging device 102, locations along the vessel 404 can have corresponding a B-mode IVUS image. Based on the tissue characterization processing performed by the processing system 106 on the intraluminal imaging signals, some locations along the vessel 404 can have a VH color map overlaid over the B-mode IVUS image. For example, indicator 408 indicates that the VH-IVUS image 410 is available at that location. Various locations of the vessel 404 can have both B-mode and VH-IVUS images. The indicator 408 can be a graphic overlaid on the extravascular image 402. In some embodiments, the indicator 408 is part of the extravascular image 402 generated by the extravascular imaging device 103 and/or the processing system 106. The indicator 408 can be positioned over, adjacent, and/or otherwise proximate to the vessel 404 (e.g., at the location along the length of the vessel where tissue characterization information, such as a VH-IVUS image is available). In that regard, different locations along the length of the vessel (e.g., locations 502, 504, 506, 508 of FIG. 5) may or may not have tissue characterization information. The indicator 408 can be any suitable graphical, symbolic, alphabetical, and/or numerical display. In the illustrated embodiment of FIG. 4, the indicator 406 is a straight line segment. Any suitably shaped symbol, such as a circle, square, diamond, etc., is contemplated. In some embodiments, the indicator 408 is colored using any suitable color. The coloring of the indicator 408 can visually accentuate the location on the extravascular image 402. For example, a yellow color for the indicator 408 visually accentuates the indicator 406 against a black/white or grayscale angiogram 402. While the extravascular image 402 in FIG. 4 includes one indicator 408, it is understood that the extravascular image 402 can include two, three, four, or more indicators 408.

When a particular IVUS image frame does not satisfy the spatial distribution criterion in step 312, the method 300 includes the processing system outputting screen display. The screen display includes the extravascular image 402 without an indicator at the location corresponding to that IVUS image frame.

The steps 302, 304, 306, 308, 310, 312, 314 of method 300 can be repeated for each image frame of the IVUS image sequence (e.g., along the length of the vessel) obtained by the imaging device 102. Image frames 502, 504, 506, 508 (FIG. 5) are example image frames for which the method 300 can be performed. Performing steps of the method 300 for a plurality of frames of IVUS ensures that the indicators 406 and/or 408 are positioned at the correct location(s) along the length of the vessel 404 in the extravascular image 402. In some embodiments, one or more steps of the method 300 is iteratively performed on each frame, from the first image frame to the last image frame, of an IVUS image sequence. In some embodiments, one or more steps of the method 300 is iteratively performed on a portion of the frames of an IVUS image sequence, e.g., a subset of the IVUS image sequence length of the vessel 404. For example, the subset may be manually identified by a user or automatically identified based on image processing on the extravascular image 402 and/or the IVUS image sequence to identify an area of the vessel with a narrowing as a result of plaque formation. The method 300 can be performed during and/or after intravascular image signal acquisition has commenced by the imaging device 102. For example, the method 300 can commence after at least some intravascular data has been obtained, after at least one image frame has been generated, after all intravascular data has been obtained for the image sequence, and/or after all images frames have been generated for the image sequence. The method 300 can terminate when no images frames of a sequence remain that need to be evaluated to determine if the spatial description criterion is satisfied.

The method 300 and/or the screen display 400 allows a location of the vessel 404 in the angiogram image 402 to be linked to morphological information of the vessel at that location. This advantageously guides treatment of the vessel. For example, the indicator 406 can identify a location of the vessel where treatment needs to be performed. Any suitable treatment, such as angioplasty, stenting, ablation, atherectomy, pharmacological agents, and/or combinations therefor, are contemplated.

For example, the aspects of the present disclosure advantageously guide the user towards proper stent positioning within a vessel. In that regard, FIG. 5 illustrates the vessel 404 with plaque formations 516 and 518. The plaque formation 518 can include necrotic core 417. The plaque formation 516 can be formed primarily of fibrous and/or fibro-fatty plaque types. The plaque formation 516 extends into the lumen of the vessel, creating a narrowing that occludes blood flow. Positioning a stent within the vessel 404 can allow the lumen to be expanded.

In the absence of the present disclosure, the risk of incorrect positioning of the stent is higher, because conventional systems do not provide a clear and easy way to combine VH information, which can identify the necrotic core 417, and the location of the necrotic core 417 along the length of the vessel. Incorrect placement of a stent is illustrated in FIG. 6. In particular, the edge 604 of the stent 602 is positioned at the necrotic core 414. While the lumen is re-established in the area of the plaque formation 516, the efficacy of this treatment is limited. This is because the stent edge 604 at the necrotic core 414 increases the changes of stent thrombosis, which can lead to narrowing of the vessel, acute coronary syndrome (ACS), and/or decreased blood flow.

The present application advantageously addresses the shortcomings of conventional systems by providing an extravascular image 402 (FIG. 4) that includes an indication 406 where the necrotic core 414 is located along the length of the vessel 404. In particular, the indication 406 identifies where the spatial distribution of necrotic core is concerning enough that it needs to be considered by the clinician. Because the clinician is able to visualize this location on the screen display 400, the clinician can more easily understand where to position the stent correctly. This leads to better efficacy in treatment and patient outcomes. FIG. 7 illustrates the correct placement of the stent 602, which re-establishes the lumen in the area of the plaque formation 516. In particular, the struts of the stent 602 extend over and cover the necrotic core 414, such that the stent edge 604 is spaced from the necrotic core 414. Such positioning of the stent 602 is less likely to lead to stent thrombosis.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A system, comprising:
    a processor circuit in communication with an intravascular imaging catheter, the processor circuit operable to:
        receive an intravascular imaging signal generated by the intravascular imaging catheter while the intravascular imaging catheter is moved to a plurality of locations of a blood vessel;
        generate, based on the intravascular imaging signal, a plurality of intravascular images representative of the plurality of locations, wherein the plurality of intravascular images comprises a plurality of circumferential cross-sections of the blood vessel;
        receive an extravascular image of a blood vessel obtained by an extravascular imaging device;
        co-register the plurality of intravascular images and the extravascular image;
        perform tissue characterization to identify a set of the plurality of locations where calcium is present;
        determine a plurality of arc angles descriptive of the calcium within a wall of the blood vessel in the plurality of the intravascular images;
        perform a comparison between the plurality of arc angles and a threshold arc angle, wherein the plurality of arc angles and the threshold arc angle are measured around a lumen of the blood vessel within the plurality of circumferential cross-sections;
        determine a subset of the set of the plurality of locations where:
            the calcium is present; and
            an arc angle of the plurality of arc angles satisfies the threshold arc angle based on the comparison; and
        output, to a display in communication with the processor circuit, a screen display comprising:
            the extravascular image; and
            a first indicator in the extravascular image, wherein the first indicator is provided in the extravascular image only at the subset of the set of the plurality of locations.

2. The system of claim 1,
    wherein the threshold arc angle comprises 180 degrees,
    wherein a value of the arc angle comprising 180 degrees or greater satisfies threshold arc angle.

3. The system of claim 1, wherein the first indicator is positioned adjacent to the blood vessel at the subset of the set of the plurality of locations in the extravascular image.

4. The system of claim 1, wherein the screen display comprises an intravascular image.

5. The system of claim 4,
    wherein the intravascular image comprises a virtual histology image, and
    wherein the screen display comprises a second indicator in the extravascular image,
    wherein the second indicator is representative of a location of the virtual histology image.

6. The system of claim 1,
    wherein the processor circuit performing tissue characterization comprises identifying a plurality of plaque components of the blood vessel,
    wherein the plurality of plaque components comprises the calcium, necrotic core, fibro-fatty, and fibrous tissue.

7. The system of claim 6, wherein the processor circuit is operable to determine if the calcium is present in an intravascular image after performing the tissue characterization to identify the plurality of plaque components.

8. The system of claim 1,
    further comprising the intravascular imaging catheter,
    wherein the intravascular imaging catheter comprises an intravascular ultrasound (IVUS) imaging catheter.

9. The system of claim 1,
    wherein the extravascular image depicts a length of the blood vessel,
    wherein the threshold arc angle comprises a criterion within the plurality of circumferential cross-sections, wherein the first indicator is configured to provide an indication along the length of the blood vessel where the criterion within the plurality of circumferential cross-sections is satisfied.

10. A method, comprising:

receiving, with a processor circuit in communication with an intravascular imaging catheter, an intravascular imaging signal generated by the intravascular imaging catheter while the intravascular imaging catheter is moved to a plurality of locations of a blood vessel;

generating, with the processor circuit, a plurality of intravascular images representative of the plurality of locations, based on the intravascular imaging signal, wherein the plurality of intravascular images comprises a plurality of circumferential cross-sections of the blood vessel;

receiving, with the processor circuit, an extravascular image of a blood vessel obtained by an extravascular imaging device;

co-registering, with the processor circuit, the plurality of intravascular images and the extravascular image;

performing tissue characterization to identify a set of the plurality of locations where calcium is present;

determining a plurality of arc angles descriptive of the calcium within a wall of the blood vessel in the plurality of the intravascular images;

performing a comparison between the plurality of arc angles and a threshold arc angle, wherein the plurality of arc angles and the threshold arc angle are measured around a lumen of the blood vessel within the plurality of circumferential cross-sections;

determining, with the processor circuit, a subset of the set of the plurality of locations where:
the calcium is present; and
an arc angle of the plurality of arc angles satisfies the threshold arc angle based on the comparison; and outputting, to a display in communication with the processor circuit, a screen display comprising:
the extravascular image; and
a first indicator in the extravascular image, wherein the first indicator is provided in the extravascular image only at the subset of the set of the plurality of locations.

11. The method of claim 10,
wherein the threshold arc angle comprises 180 degrees,
wherein a value of the arc angle comprising 180 degrees or greater satisfies threshold arc angle.

12. The method of claim 10, wherein the first indicator is positioned adjacent to the blood vessel at the subset of the set of the plurality of locations in the extravascular image.

13. The method of claim 10, wherein the screen display comprises an intravascular image.

14. The method of claim 13,
wherein the intravascular image comprises a virtual histology image, and
wherein the screen display comprises a second indicator in the extravascular image,
wherein the second indicator is representative of a location of the virtual histology image.

15. The method of claim 10,
wherein performing tissue characterization comprises identifying a plurality of plaque components of the blood vessel,
wherein the plurality of plaque components comprises the calcium, necrotic core, fibro-fatty, and fibrous tissue.

16. The method of claim 15, further comprising:
determining if the calcium is present in an intravascular image after performing the tissue characterization to identify the plurality of plaque components.

* * * * *